US011868837B2

(12) United States Patent
Lin et al.

(10) Patent No.: US 11,868,837 B2
(45) Date of Patent: *Jan. 9, 2024

(54) ELECTRONIC CIGARETTE WITH NFC ANTI-COUNTERFEITING CODE AND ANTI-COUNTERFEITING METHOD THEREOF

(71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 30 days.

This patent is subject to a terminal disclaimer.

(21) Appl. No.: 17/629,368

(22) PCT Filed: Aug. 10, 2020

(86) PCT No.: PCT/CN2020/108081
§ 371 (c)(1),
(2) Date: Jan. 21, 2022

(87) PCT Pub. No.: WO2021/036766
PCT Pub. Date: Mar. 4, 2021

(65) Prior Publication Data
US 2022/0253615 A1 Aug. 11, 2022

(30) Foreign Application Priority Data
Aug. 30, 2019 (CN) .......................... 201910818331.9

(51) Int. Cl.
*G06K 7/10* (2006.01)
*A24F 40/53* (2020.01)
(Continued)

(52) U.S. Cl.
CPC .......... *G06K 7/10297* (2013.01); *A24F 40/53* (2020.01); *A24F 40/60* (2020.01); *A24F 40/65* (2020.01); *G06K 19/07758* (2013.01)

(58) Field of Classification Search
CPC ..... G06K 7/10297; A24F 40/53; A24F 40/65; A24F 40/60
(Continued)

(56) References Cited

U.S. PATENT DOCUMENTS

2017/0045994 A1* 2/2017 Murison ................. H02J 7/342
2021/0251291 A1* 8/2021 Schmidlin ............ H05B 1/0297
2022/0361581 A1* 11/2022 Lin .......................... G06F 21/44

FOREIGN PATENT DOCUMENTS

| CN | 105962427 A | 9/2016 |
| CN | 105578908 B | 5/2019 |
| CN | 211211440 U | 8/2020 |

OTHER PUBLICATIONS

International Search Report of PCT Patent Application No. PCT/CN2020/108081 dated Nov. 16, 2020.

* cited by examiner

*Primary Examiner* — Ahshik Kim

(57) ABSTRACT

The disclosure provides an electronic cigarette with NFC anti-counterfeiting code and an anti-counterfeiting method thereof. The electronic cigarette comprises a vaporizer arranged with an insertion portion, and a battery rod arranged with a receiving portion for accommodating the insertion portion. The battery rod comprises a battery, and a control circuit board arranged with a microcontroller and a switching circuit. When the insertion portion is inserted in (Continued)

the receiving portion such that the NFC tag and the NFC tag antenna of the insertion portion are close to the NFC card reader and the NFC card reader antenna of the receiving portion, the NFC card reader automatically reads the anti-counterfeiting code preset in the NFC tag and sends it to the microcontroller for identification. If the anti-counterfeiting code is correct, the microcontroller MCU controls switching on of the switching circuit to allow the electronic cigarette to enter a standby state.

13 Claims, 7 Drawing Sheets

(51) Int. Cl.
*A24F 40/65* (2020.01)
*A24F 40/60* (2020.01)
*G06K 19/077* (2006.01)

(58) Field of Classification Search
USPC .......................................................... 235/451
See application file for complete search history.

US 11,868,837 B2

ELECTRONIC CIGARETTE WITH NFC ANTI-COUNTERFEITING CODE AND ANTI-COUNTERFEITING METHOD THEREOF

TECHNICAL FIELD

The disclosure relates to the field of electronic cigarettes, more particularly to an electronic cigarette with NFC anti-counterfeiting code and an anti-counterfeiting method of the electronic cigarette with NFC anti-counterfeiting code.

BACKGROUND

The electronic cigarettes usually heat and vaporize the electronic cigarette liquid by means of a vaporizing device, to produce vapor for the smoker. It is known that tobacco cigarettes contain tobacco tars which are very harmful to the human body. Since the electronic cigarette liquid does not contain the tobacco tar, the harm to the human body is reduced. Thus, the electronic cigarettes are widely used and gradually replace tobacco cigarettes.

With the rise in popularity of the electronic cigarette, sales of the electronic cigarettes in the market grow year by year. Some famous electronic cigarettes with good quality are very popular among customers and are in great demand. Meanwhile, some electronic cigarettes which are not selling well due to poor quality may be passed off as the famous electronic cigarettes or vaporizers for replacement. These electronic cigarettes with poor quality may be attractive to consumers due to low price. However, during use, these electronic cigarettes with poor quality may be prone to deficiencies such as liquid leakage, circuit break, insufficient vapor, and poor e-cigarette liquid quality, which may contribute to poor user experience for users and bad reputation for legitimate manufactures. The existing electronic cigarettes have failed to effectively overcome the problem of how to realize anti-counterfeiting for the vaporizers of electronic cigarettes and verify genuine product to prevent counterfeits.

SUMMARY

Technical Problem

An object of the disclosure is to overcome the above deficiencies and provide an electronic cigarette with NFC anti-counterfeiting code and an anti-counterfeiting method thereof, wherein the electronic cigarette with NFC anti-counterfeiting code, which comprises a vaporizer additionally arranged with an NFC electronic tag and comprises a battery rod arranged with an NFC card reader for reading the anti-counterfeiting code of the NFC electronic tag, can effectively achieve identification of the counterfeits and realize anti-counterfeiting.

Technical Solutions

The disclosure provides a technical solution as follow. An electronic cigarette with NFC anti-counterfeiting code comprises a vaporizer and a battery rod which are connected in a detachable manner, wherein the vaporizer is arranged with an insertion portion, and the battery rod is arranged with a receiving portion for accommodating the insertion portion to achieve connection. The side wall of the insertion portion is provided with an NFC tag and an NFC tag antenna. The side wall of the receiving portion is provided with an NFC card reader and an NFC card reader antenna. The NFC tag is preset with an anti-counterfeiting code. Inside the vaporizer, a heating element is provided. The battery rod comprises a battery and a control circuit board, wherein the control circuit board is arranged with a microcontroller and a switching circuit. The NFC card reader is configured to automatically read the anti-counterfeiting code preset in the NFC tag in the case that the insertion portion is inserted in the receiving portion such that the NFC tag and the NFC tag antenna are close to the NFC card reader and the NFC card reader antenna, and send the anti-counterfeiting code to the microcontroller for performing identification. The microcontroller MCU is configured to control switching on of the switching circuit to allow the electronic cigarette to enter a standby state if the anti-counterfeiting code is correct.

Preferably, the microcontroller may be configured to control switching off of the switching circuit in the case that a standby time exceeds the preset standby time of the electronic cigarette.

Preferably, the microcontroller may be configured to randomly generate a new anti-counterfeiting code based on a preset program in the case that the correct anti-counterfeiting code is identified by means of the microcontroller, and send the new anti-counterfeiting code to the NFC tag by means of the NFC card reader, to allow the NFC tag to store the new anti-counterfeiting code.

Preferably, the vaporizer or the battery rod may be further provided with a trigger switch, and the trigger switch may be a microphone-type automatic air flow switch or a digital pressure switch.

Preferably, the vaporizer or the battery rod may be provided with a display unit or a vibration alarm unit, and the display unit or the vibration alarm unit may be electrically connected with the microcontroller.

Preferably, the microcontroller may include 28 pins. Herein, the third pin is connected with the power supply signal VDD. The fourth pin is grounded. The seventh pin is connected with the card reader enable signal CS. The eighth pin is connected with the first voltage signal R-DET of the heating element. The ninth pin is connected with the second voltage signal I-DET of the heating element. The fourteenth pin is connected with the resistance detection enable signal R-DET-EN. The twenty-second pin is connected with the output enable signal PWM-EN. The twenty-sixth pin is connected with the data signal SDA. The twenty-seventh pin is connected with the clock signal SCL.

Preferably, the NFC tag may include two pins respectively connected with two ends of the NFC tag antenna.

Preferably, the NFC card reader may be the card reader chip U3 which includes 32 pins. Herein, the twenty-sixth pin is connected with the power supply signal VDD. The twenty-seventh pin, the twenty-eighth pin, and the thirtieth pin are grounded. The twenty-ninth pin is connected with the clock signal SCL and one end of the resistor R58. The thirty-first pin is connected with the data signal SDA and one end of the resistor R59. The twenty-first pin is connected with the card reader enable signal CS and one end of the resistor R60. The other end of the resistors R58, R59, R60 is connected in common with the power supply signal VDD. The twenty-fifth pin is connected with the power supply signal VDD and one end of the capacitor C23. The eighth pin is connected with the power supply signal VDD and one end of the capacitor C22. The other ends of the capacitors C23 and C22 are respectively grounded. The fourteenth pin is connected with one end of the capacitor C21. The other end of the capacitor C21 is grounded. The eighteenth pin is connected with the power supply signal VDD. The thirteenth pin, the fifteenth pin, the sixteenth pin, the seventeenth pin, and the twelfth pin are respectively connected with matching circuits of the NFC card reader antenna.

Preferably, the NFC card reader antenna may include 3 pins, and the matching circuits of the NFC card reader antenna are configured as follows.

The thirteenth pin of the card reader chip U3 is connected with one end of the capacitor C34. The other end of the capacitor C34 is connected with one end of the resistor R14. The fifteenth pin is connected with one end of the inductor L3. The other end of the inductor L3 is connected with one end of the capacitors C39, C48 connected in parallel, and meanwhile the other end of the inductor L3 and the other end of the resistor R14 are connected in common with one end of the capacitors C31, C41, C44 connected in parallel. The other end of the capacitors C31, C41, C44 connected in parallel is connected with one end of the capacitors C40, C25 connected in parallel and meanwhile is connected with one end of the resistor R22. The other end of the resistor R22 is connected with the first pin of the NFC card reader antenna.

The twelfth pin of the card reader chip U3 is connected with one end of the capacitor C35. The other end of the capacitor C35 is connected with one end of the resistor R15. The seventeenth pin is connected with one end of the inductor L2. The other end of the inductor L2 is connected with one end of the capacitors C38, C47 connected in parallel, and meanwhile the other end of the inductor L2 and the other end of the resistor R15 are connected in common with one end of the capacitors C26, C42, C43 connected in parallel. The other end of the capacitors C26, C42, C43 connected in parallel is connected with one end of the capacitors C32, C24 connected in parallel and meanwhile is connected with one end of the resistor R31. The other end of the resistor R31 is connected with the third pin of the NFC card reader antenna.

The sixteenth pin of the card reader chip U3 is connected with the other end of the capacitors C39, C48 connected in parallel, the other end of the capacitors C38, C47 connected in parallel, the other end of the capacitors C40, C25 connected in parallel, the other end of the capacitors C32, C24 connected in parallel, and one end of the resistor R65, respectively, and is grounded. The other end of the resistor R65 is connected with the second pin of the NFC card reader antenna.

Preferably, the circuit board may have an output detection circuit comprising an MOS transistor Q1 and an MOS transistor Q2. The MOS transistor Q1 and the MOS transistor Q2 respectively include 8 pins. Herein, the first pin, the second pin, the sixth pin, the seventh pin, and the eighth pin are combined and serve as the drain D. The third pin serves as the gate G. The fourth pin and the fifth pin are combined and serve as the source S. The drain D of the MOS transistor Q2 is connected with the output voltage signal PWM-OUT of the heating element. Meanwhile, the drain D of the MOS transistor Q2 is connected with the resistor R3 and then connected with the second voltage signal I-DET of the heating element. The second voltage signal I-DET of the heating element is connected with the resistor R33 and the capacitor C2 which are connected in parallel and then is grounded. The drain D of the MOS transistor Q1 is connected with the resistor R11 and then connected with the first voltage signal R-DET of the heating element. The first voltage signal R-DET of the heating element is connected with the resistor R24 and the capacitor C1 which are connected in parallel and then is grounded. Further, the resistor R5 is connected between the drain D of the MOS transistor Q1 and the drain D of the MOS transistor Q2. The resistor R7 is connected in series between the gate G and the source S of the MOS transistor Q2. The resistor R1 is connected in series with the gate G and the source S of the MOS transistor Q1. The source S of the MOS transistor Q2 is directly connected with the source S of the MOS transistor Q1 and is further connected with the power supply signal BAT+. The gate G of the MOS transistor Q2 is connected with the enable signal PWM-EN. The gate G of the MOS transistor Q1 is connected with the resistance detection enable signal R-DET-EN.

Preferably, the circuit board may have a power supply circuit comprising a power supply chip U5. The power supply chip U5 includes 4 pins. Herein, the pin A1 and the pin B1 are directly connected with each other and meanwhile are connected with the power supply signal BAT+ and the capacitors C12, C5. The other end of the capacitors C12, C5 is grounded. The pin A2 is connected with the power supply signal VDD and meanwhile is connected with the capacitors C13, C3. The other end of the capacitors C13, C3 is grounded. The zener diode D4 is connected in series between the pin A2 and the pin A1. The pin B2 is grounded.

The disclosure provides another technical solution as follow. An anti-counterfeiting method of an electronic cigarette with NFC anti-counterfeiting code comprises steps as follows.

(1) Setting initial relative parameters;

(2) Determining whether the switching circuit is turned off or not, if yes, await to go to the step (5); if no, go to next step;

(3) By means of the microcontroller, determining whether the standby time exceeds the preset standby time or not, if yes, go to next step; if no, remain in the standby state;

(4) By means of the microcontroller, controlling switching off of the switching circuit, and then going back to the step (2);

(5) Connecting the vaporizer with the battery rod or activating the NFC card reader;

(6) By means of the NFC card reader, reading the anti-counterfeiting code preset in the NFC tag and sending it to the microcontroller;

(7) By means of the microcontroller, comparing the anti-counterfeiting code prestored in the microcontroller with the anti-counterfeiting code preset in the NFC tag and determining whether they coincide with each other or not, if yes, go to the step (9); if no, go to next step;

(8) By means of the microcontroller, sending out an alarm signal and informing the user to use a valid vaporizer, and awaiting the invalid vaporizer to be removed by the user to go back to the step (5);

(9) By means of the microcontroller, controlling switching on of the switching circuit;

(10) Entering the standby state of the electronic cigarette, and going back to the step (3).

Preferably, between the step (9) and the step (10), the method further comprises steps as follows.

(9.1) By means of the microcontroller, randomly generating a new anti-counterfeiting code based on a preset program, storing it, and sending it to the NFC tag;

(9.2) Storing the new anti-counterfeiting code by means of the NFC tag.

Advantages

The electronic cigarette with NFC anti-counterfeiting code comprises the vaporizer further provided with NFC tag and NFC tag antenna and comprises the battery rod further provided with NFC card reader and NFC card reader antenna, and the NFC tag and the microcontroller are preset with an identical anti-counterfeiting code. In the case that the vaporizer is connected with the battery rod, the NFC tag and the NFC tag antenna perform NFC wireless communication with the microcontroller, to allow the NFC card reader to read the anti-counterfeiting code of the NFC tag, thereby achieving the identification of the anti-counterfeiting code by means of the microcontroller. If the anti-counterfeiting code is correct, the microcontroller controls switching on of the switching circuit, to allow the electronic cigarette to enter the standby state. In this way, due to the NFC electronic tag provided on the vaporizer and the NFC card reader provided on the battery rod to read the anti-counterfeiting code of the NFC electronic tag, the identification of the counterfeits can be effectively achieved, thereby facilitating anti-counterfeiting.

DETAILED DESCRIPTION OF ILLUSTRATED EMBODIMENTS

Figure 1:
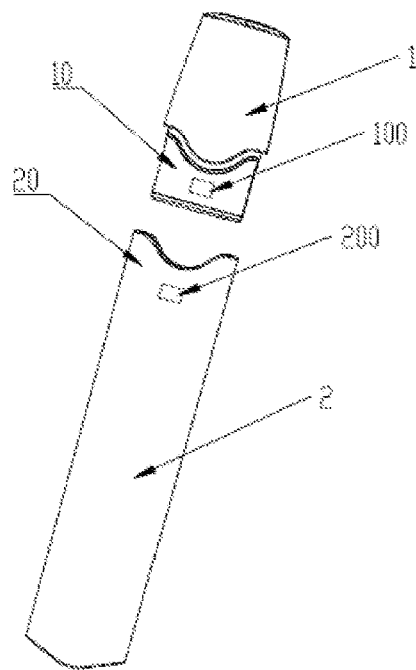
FIG. 1 is a schematic view illustrating an electronic cigarette with NFC anti-counterfeiting code in a disassembled state according to the disclosure.
Figure 2:
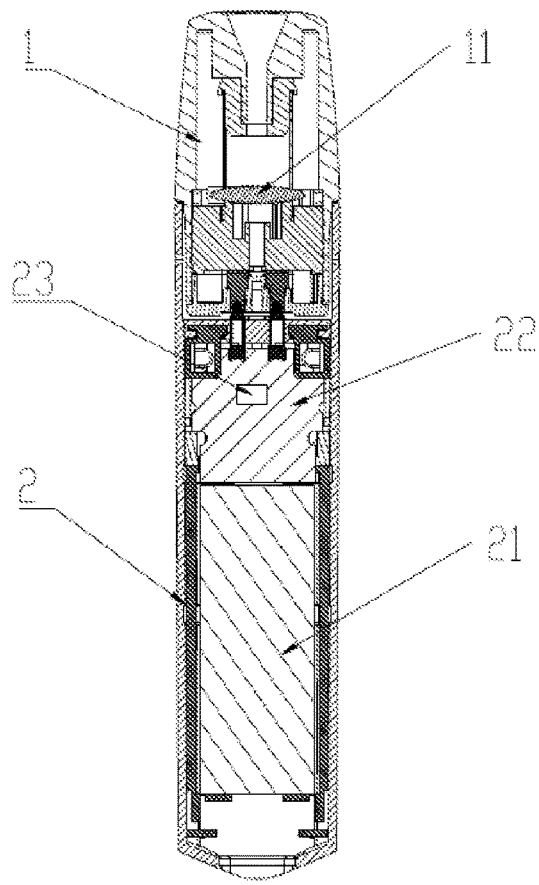
FIG. 2 is a cross-sectional view illustrating an electronic cigarette with NFC anti-counterfeiting code according to the disclosure.

Referring to FIGS. 1 and 2, the disclosure provides an electronic cigarette with NFC anti-counterfeiting code, which comprises a vaporizer 1 and a battery rod 2 which are connected in a detachable manner. Herein, the vaporizer 1 is arranged with an insertion portion 10, and the battery rod 2 is arranged with a receiving portion 20 for accommodating the insertion portion to achieve connection. The side wall of the insertion portion 10 is provided with an NFC tag 100 and an NFC tag antenna (not shown in the drawings). The NFC tag 100 and the NFC tag antenna may be integrally embedded in the side wall of the insertion portion 10 of the vaporizer during manufacturing process. The side wall of the receiving portion 20 is provided with an NFC card reader 200 and an NFC card reader antenna (not shown in the drawings). The NFC card reader 200 and the NFC card reader antenna may be integrally embedded in the side wall of the receiving portion 20 of the battery rod during manufacturing process. In this way, the space inside the side wall of the receiving portion 20 is not occupied, facilitating the connection and disconnection with the insertion portion 10. The NFC tag 100 is preset with an anti-counterfeiting code. Inside the vaporizer 1, a heating element 11 is provided for heating and vaporizing electronic cigarette liquid to generate electronic cigarette vapor. The battery rod 2 comprises a battery 21 and a control circuit board 22, wherein the control circuit board 22 is arranged with a microcontroller 23 and a switching circuit (not shown in the drawings). In the case that the insertion portion 10 is inserted in the receiving portion 20 such that the NFC tag 100 and the NFC tag antenna are close to the NFC card reader 200 and the NFC card reader antenna, the NFC card reader 200 automatically reads the anti-counterfeiting code preset in the NFC tag 100 and sends it to the microcontroller 23. The microcontroller 23 which pre-stores an anti-counterfeiting code can perform comparation and identification. If the anti-counterfeiting code is correct, the microcontroller 23 controls switching on of the switching circuit to allow the electronic cigarette to enter a standby state.

If a standby time exceeds the preset standby time of the electronic cigarette, the microcontroller 23 controls switching off of the switching circuit to allow the electronic cigarette to enter a sleep state or perform power off operation. In the standby state, the user may take a puff at any time. In the case that the user stops taking a puff for a period of time, the standby time exceeds the preset standby time.

After the microcontroller 23 identifies the correct anti-counterfeiting code, the microcontroller 23 randomly generates a new anti-counterfeiting code based on a preset program and sends it to the NFC tag antenna and the NFC tag 100 by means of the NFC card reader 200 and its antenna, and the NFC tag 100 stores the new anti-counterfeiting code. The anti-counterfeiting code may include fixed code and may include dynamic code randomly generated based on a preset program. The vaporizer 1 or the battery rod 2 may be further provided with a trigger switch (not shown in the drawings), and the trigger switch may be a microphone-type automatic air flow switch or a digital pressure switch.

The vaporizer 1 or the battery rod 2 may be provided with a display unit or a vibration alarm unit (not shown in the drawings), and the display unit or the vibration alarm unit may be electrically connected with the microcontroller.

Figure 3:
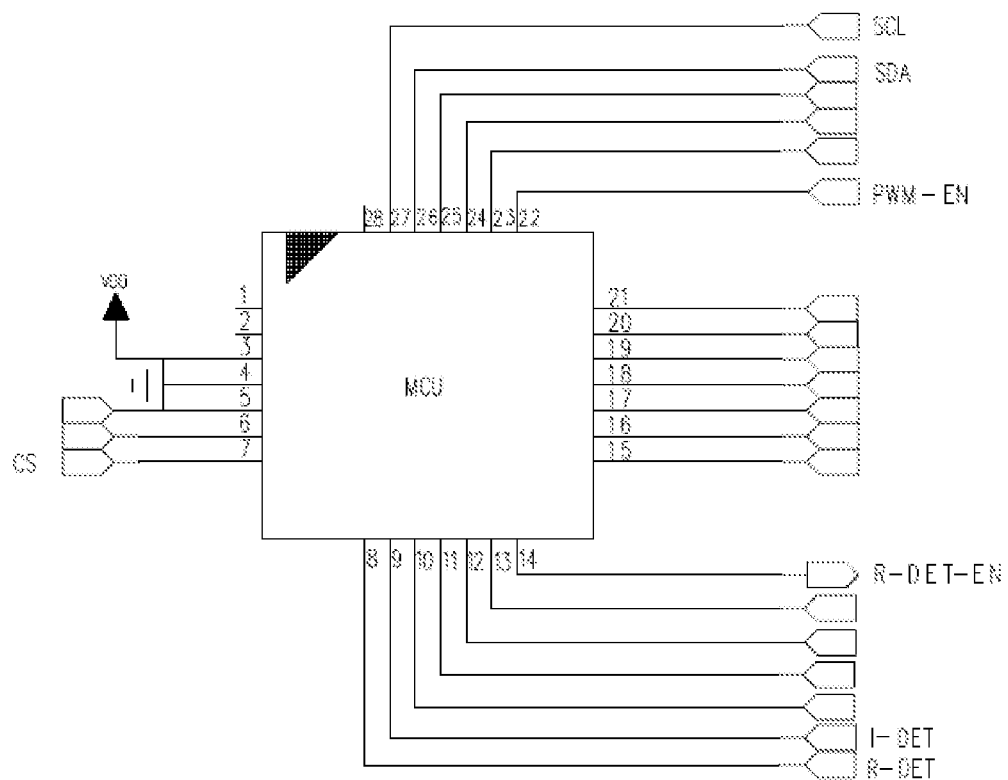
FIG. 3 is a circuit diagram of a microcontroller of an electronic cigarette with NFC anti-counterfeiting code according to the disclosure.

Referring to FIG. 3, the microcontroller MCU includes 28 pins. Herein, the third pin is connected with the power supply signal VDD. The fourth pin is grounded. The seventh pin is connected with the card reader enable signal CS. The eighth pin is connected with the first voltage signal R-DET of the heating element. The ninth pin is connected with the second voltage signal I-DET of the heating element. The fourteenth pin is connected with the resistance detection enable signal R-DET-EN. The twenty-second pin is connected with the output enable signal PWM-EN. The twenty-sixth pin is connected with the data signal SDA. The twenty-seventh pin is connected with the clock signal SCL.

Figure 4:
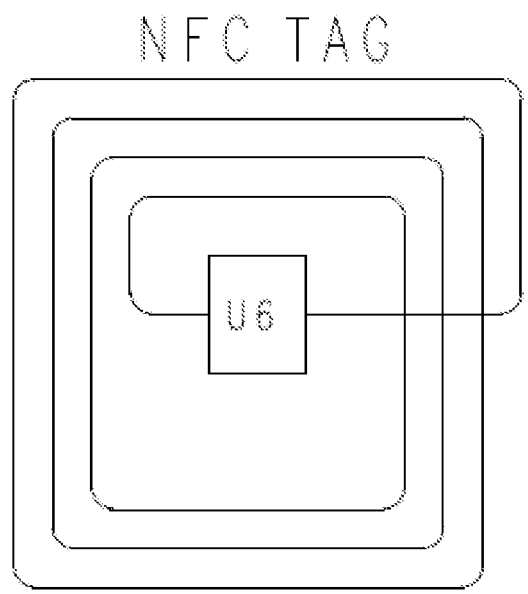
FIG. 4 is a schematic view illustrating an NFC tag and its antenna of an electronic cigarette with NFC anti-counterfeiting code according to the disclosure.

Referring to FIG. 4, the NFC tag is the chip U6, which includes two pins respectively connected with two ends of the annular shaped NFC tag antenna NFC TAG.

Figure 5:
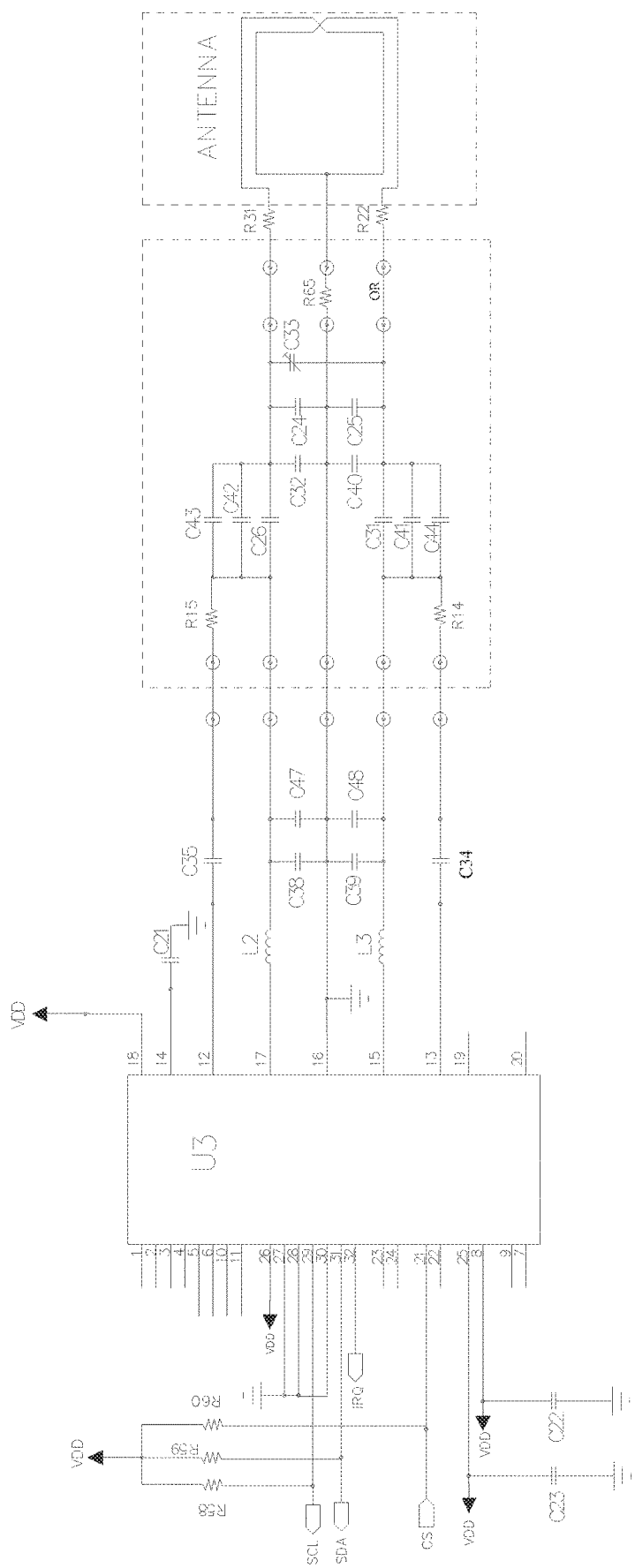
FIG. 5 is a circuit diagram of an NFC card reader of an electronic cigarette with NFC anti-counterfeiting code according to the disclosure.

Referring to FIG. 5, the NFC card reader is the card reader chip U3 which includes 32 pins. Herein, the twenty-sixth pin is connected with the power supply signal VDD. The twenty-seventh pin, the twenty-eighth pin, and the thirtieth pin are grounded. The twenty-ninth pin is connected with the clock signal SCL and one end of the resistor R58. The thirty-first pin is connected with the data signal SDA and one end of the resistor R59. The twenty-first pin is connected with the card reader enable signal CS and one end of the resistor R60. The other end of the resistors R58, R59, R60 is connected in common with the power supply signal VDD. The twenty-fifth pin is connected with the power supply signal VDD and one end of the capacitor C23. The eighth pin is connected with the power supply signal VDD and one end of the capacitor C22. The other ends of the capacitors C23 and C22 are respectively grounded. The fourteenth pin is connected with one end of the capacitor C21. The other end of the capacitor C21 is grounded. The eighteenth pin is connected with the power supply signal VDD. The thirteenth pin, the fifteenth pin, the sixteenth pin, the seventeenth pin, and the twelfth pin are respectively connected with matching circuits of the NFC card reader antenna.

The NFC card reader antenna ANTENNA includes 3 pins, and the matching circuits of the NFC card reader antenna ANTENNA are configured as follows.

The thirteenth pin of the card reader chip U3 is connected with one end of the capacitor C34. The other end of the capacitor C34 is connected with one end of the resistor R14. The fifteenth pin is connected with one end of the inductor L3. The other end of the inductor L3 is connected with one end of the capacitors C39, C48 connected in parallel, and meanwhile the other end of the inductor L3 and the other end of the resistor R14 are connected in common with one end of the capacitors C31, C41, C44 connected in parallel. The other end of the capacitors C31, C41, C44 connected in parallel is connected with one end of the capacitors C40, C25 connected in parallel and meanwhile is connected with one end of the resistor R22. The other end of the resistor R22 is connected with the first pin of the NFC card reader antenna ANTENNA. The twelfth pin of the card reader chip U3 is connected with one end of the capacitor C35. The other end of the capacitor C35 is connected with one end of the resistor R15. The seventeenth pin is connected with one end of the inductor L2. The other end of the inductor L2 is connected with one end of the capacitors C38, C47 connected in parallel, and meanwhile the other end of the inductor L2 and the other end of the resistor R15 are connected in common with one end of the capacitors C26, C42, C43 connected in parallel. The other end of the capacitors C26, C42, C43 connected in parallel is connected with one end of the capacitors C32, C24 connected in parallel and meanwhile is connected with one end of the resistor R31. The other end of the resistor R31 is connected with the third pin of the NFC card reader antenna ANTENNA.

Meanwhile, the sixteenth pin of the card reader chip U3 is connected with the other end of the capacitors C39, C48 connected in parallel, the other end of the capacitors C38, C47 connected in parallel, the other end of the capacitors C40, C25 connected in parallel, the other end of the capacitors C32, C24 connected in parallel, and one end of the resistor R65, respectively, and is grounded. The other end of the resistor R65 is connected with the second pin of the NFC card reader antenna ANTENNA.

Figure 6:
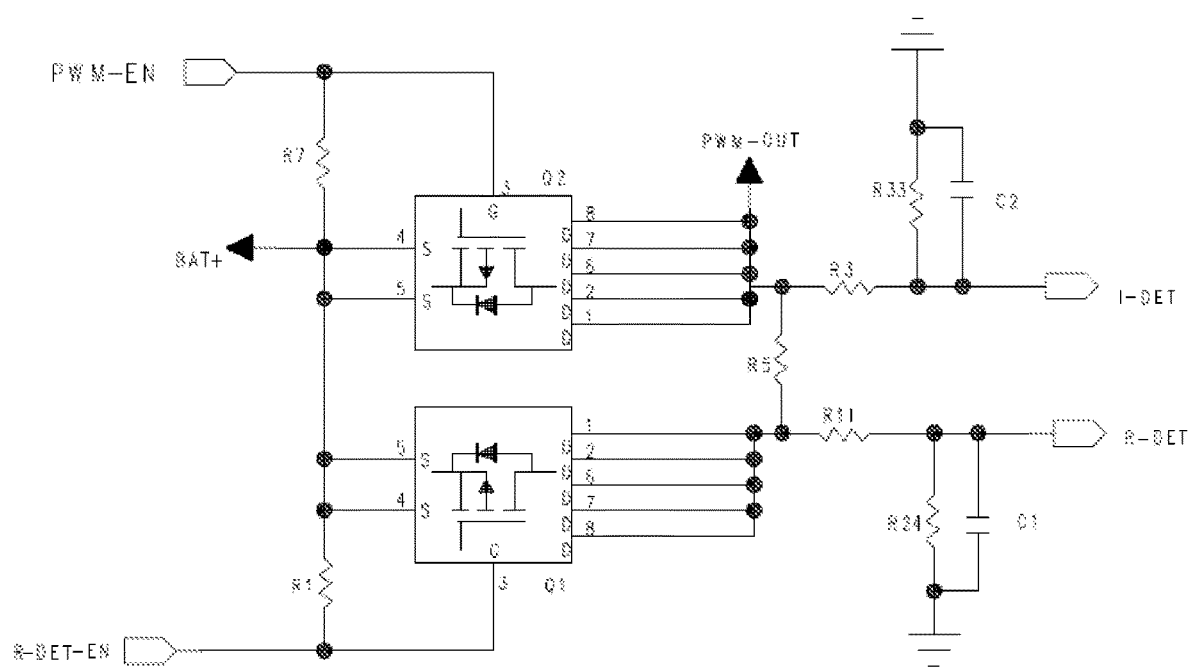
FIG. 6 is an output detection circuit diagram of an electronic cigarette with NFC anti-counterfeiting code according to the disclosure.

Referring to FIGS. 2 and 6, the circuit board 22 has an output detection circuit comprising an MOS transistor Q1 and an MOS transistor Q2. The MOS transistor Q1 and the MOS transistor Q2 respectively include 8 pins. Herein, the first pin, the second pin, the sixth pin, the seventh pin, and the eighth pin are combined and serve as the drain D. The third pin serves as the gate G. The fourth pin and the fifth pin are combined and serve as the source S. The drain D of the MOS transistor Q2 is connected with the output voltage signal PWM-OUT of the heating element. Meanwhile, the drain D of the MOS transistor Q2 is connected with the resistor R3 and then connected with the second voltage signal I-DET of the heating element. The second voltage signal I-DET of the heating element is connected with the resistor R33 and the capacitor C2 which are connected in parallel and then is grounded. The drain D of the MOS transistor Q1 is connected with the resistor R11 and then connected with the first voltage signal R-DET of the heating element. The first voltage signal R-DET of the heating element is connected with the resistor R24 and the capacitor C1 which are connected in parallel and then is grounded. Further, the resistor R5 is connected between the drain D of the MOS transistor Q1 and the drain D of the MOS transistor Q2. The resistor R7 is connected in series between the gate G and the source S of the MOS transistor Q2. The resistor R1 is connected in series with the gate G and the source S of the MOS transistor Q1. The source S of the MOS transistor Q2 is directly connected with the source S of the MOS transistor Q1 and is further connected with the power supply signal BAT+. The gate G of the MOS transistor Q2 is connected with the enable signal PWM-EN. The gate G of the MOS transistor Q1 is connected with the resistance detection enable signal R-DET-EN.

Figure 7:
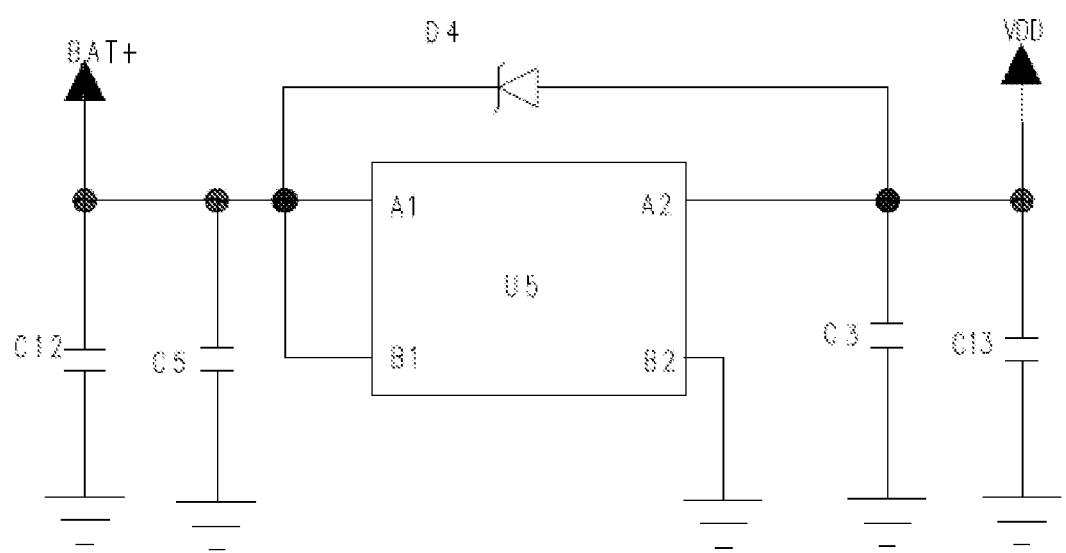
FIG. 7 is a power supply circuit diagram of an electronic cigarette with NFC anti-counterfeiting code according to the disclosure.

Referring to FIGS. 2 and 7, the circuit board 22 has a power supply circuit comprising a power supply chip U5. The power supply chip U5 includes 4 pins. Herein, the pin A1 and the pin B1 are directly connected with each other and meanwhile are connected with the power supply signal BAT+ and the capacitors C12, C5. The other end of the capacitors C12, C5 is grounded. The pin A2 is connected with the power supply signal VDD and meanwhile is connected with the capacitors C13, C3. The other end of the capacitors C13, C3 is grounded. The zener diode D4 is connected in series between the pin A2 and the pin A1. The pin B2 is grounded.

Figure 8:
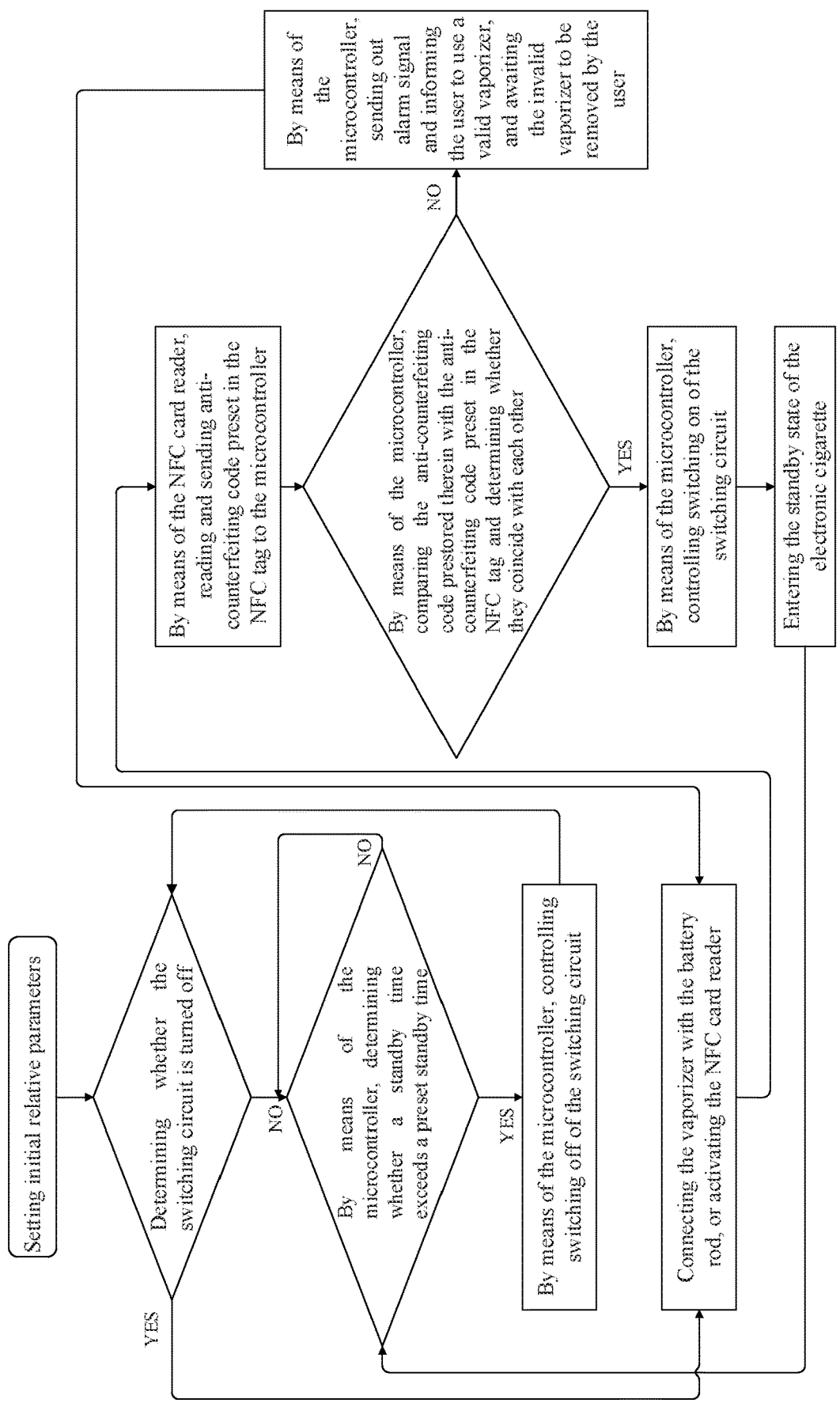
FIG. 8 is a first flowchart of an anti-counterfeiting method of an electronic cigarette with NFC anti-counterfeiting code according to the disclosure.

Referring to FIG. 8, an anti-counterfeiting method of an electronic cigarette with NFC anti-counterfeiting code comprises steps as follows.

(1) Setting initial relative parameters;

(2) Determining whether the switching circuit is turned off or not, if yes, await to go to the step (5) as the electronic cigarette is in the power-off state or sleep state; if no, go to next step as the electronic cigarette is in the power-on state or standby state;

(3) By means of the microcontroller, determining whether the standby time exceeds the preset standby time or not, if yes, go to next step; if no, remain in the standby state;

(4) By means of the microcontroller, controlling switching off of the switching circuit to enable the electronic cigarette to enter the power-off state or sleep state, and then going back to the step (2);

(5) Connecting the vaporizer with the battery rod, or, activating the NFC card reader in a certain manner, for example taking a puff, pressing the button, etc., without reconnecting the vaporizer, in the case that the vaporizer is connected with the battery rod;

(6) By means of the NFC card reader, reading the anti-counterfeiting code preset in the NFC tag and sending it to the microcontroller;

(7) By means of the microcontroller, comparing the anti-counterfeiting code prestored in the microcontroller with the anti-counterfeiting code preset in the NFC tag and determining whether they coincide with each other or not, if yes, go to the step (9); if no, go to next step;

(8) By means of the microcontroller, sending out an alarm signal and informing the user to use a valid vaporizer, and awaiting the invalid vaporizer to be removed and a valid vaporizer to be inserted by the user, to go back to the step (5);

(9) By means of the microcontroller, controlling switching on of the switching circuit;

(10) Entering the standby state of the electronic cigarette, and going back to the step (3).

Figure 9:
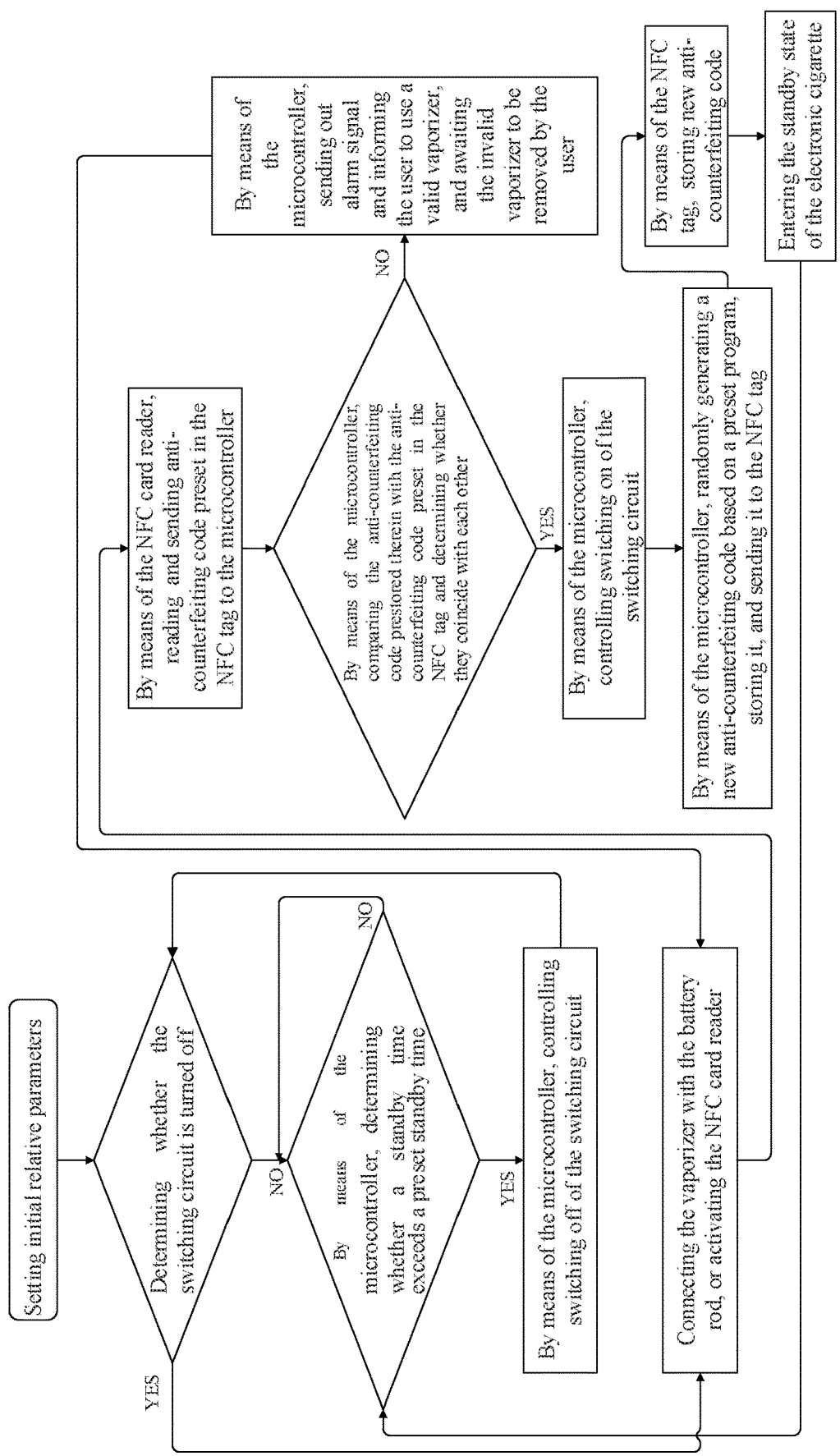
FIG. 9 is a second flowchart of an anti-counterfeiting method of an electronic cigarette with NFC anti-counterfeiting code according to the disclosure.

Referring to FIG. 9, between the step (9) and the step (10), the method further comprises steps as follows.

(9.1) By means of the microcontroller, randomly generating a new anti-counterfeiting code based on a preset program, storing it, and sending it to the NFC tag;

(9.2) Storing the new anti-counterfeiting code by means of the NFC tag.

INDUSTRIAL APPLICABILITY

All the above are merely preferred embodiments of the present invention. The present invention is intended to cover all equivalent arrangements and modifications without departing from the scope of the present invention.

The invention claimed is:

1. An electronic cigarette with NFC anti-counterfeiting code, comprising a vaporizer and a battery rod connected in a detachable manner, wherein the vaporizer is arranged with an insertion portion, and the battery rod is arranged with a receiving portion for accommodating the insertion portion to achieve connection, a side wall of the insertion portion is provided with an NFC tag and an NFC tag antenna, a side wall of the receiving portion is provided with an NFC card reader and an NFC card reader antenna, the NFC tag is preset with an anti-counterfeiting code, a heating element is provided inside the vaporizer, the battery rod comprises a battery and a control circuit board, and the control circuit board is arranged with a microcontroller and a switching circuit, wherein the NFC card reader is configured to automatically read the anti-counterfeiting code preset in the NFC tag when the insertion portion is inserted in the receiving portion such that the NFC tag and the NFC tag antenna are close to the NFC card reader and the NFC card reader antenna, and send the anti-counterfeiting code preset in the NFC tag to the microcontroller for performing identification, and the microcontroller MCU is configured to control switching on of the switching circuit to allow the electronic cigarette to enter a standby state if the anti-counterfeiting code is correct.

2. The electronic cigarette with NFC anti-counterfeiting code according to claim 1, wherein the microcontroller is configured to control switching off of the switching circuit in such a case that a standby time exceeds a preset standby time of the electronic cigarette.

3. The electronic cigarette with NFC anti-counterfeiting code according to claim 1, wherein the microcontroller is configured to randomly generate a new anti-counterfeiting code based on a preset program in such a case that the microcontroller identifies a correct anti-counterfeiting code, and send the new anti-counterfeiting code to the NFC tag by means of the NFC card reader, to enable the NFC tag to store the new anti-counterfeiting code.

4. The electronic cigarette with NFC anti-counterfeiting code according to claim 1, wherein the vaporizer or the battery rod is further provided with a trigger switch, and the trigger switch is a microphone-type automatic air flow switch or a digital pressure switch.

5. The electronic cigarette with NFC anti-counterfeiting code according to claim 1, wherein the vaporizer or the battery rod is provided with a display unit or a vibration alarm unit, and the display unit or the vibration alarm unit is electrically connected with the microcontroller.

6. The electronic cigarette with NFC anti-counterfeiting code according to claim 1, wherein the microcontroller includes 28 pins, wherein a third pin is connected with a power supply signal VDD, a fourth pin is grounded, a seventh pin is connected with a card reader enable signal CS, an eighth pin is connected with a first voltage signal R-DET of the heating element, a ninth pin is connected with a second voltage signal I-DET of the heating element, a fourteenth pin is connected with a resistance detection enable signal R-DET-EN, a twenty-second pin is connected with an output enable signal PWM-EN, a twenty-sixth pin is connected with a data signal SDA, and a twenty-seventh pin is connected with a clock signal SCL.

7. The electronic cigarette with NFC anti-counterfeiting code according to claim 6, wherein the NFC tag includes two pins respectively connected with two ends of the NFC tag antenna.

8. The electronic cigarette with NFC anti-counterfeiting code according to claim 6, wherein the NFC card reader is a card reader chip U3 including 32 pins, wherein a twenty-sixth pin is connected with a power supply signal VDD, wherein a twenty-seventh pin, a twenty-eighth pin, and a thirtieth pin are grounded, a twenty-ninth pin is connected with a clock signal SCL and one end of a resistor R58, a thirty-first pin is connected with a data signal SDA and one end of a resistor R59, a twenty-first pin is connected with a card reader enable signal CS and one end of a resistor R60, other end of the resistors R58, R59, R60 is connected in common with a power supply signal VDD, a twenty-fifth pin is connected with a power supply signal VDD and one end of a capacitor C23, an eighth pin is connected with a power supply signal VDD and one end of a capacitor C22, other ends of the capacitors C23 and C22 are respectively grounded, a fourteenth pin is connected with one end of a capacitor C21, other end of the capacitor C21 is grounded, an eighteenth pin is connected with a power supply signal VDD, a thirteenth pin, a fifteenth pin, a sixteenth pin, a seventeenth pin, and a twelfth pin are respectively connected with matching circuits of the NFC card reader antenna.

9. The electronic cigarette with NFC anti-counterfeiting code according to claim 8, wherein the NFC card reader antenna includes 3 pins, and the matching circuits of the NFC card reader antenna are configured in such a manner that:

a thirteenth pin of the card reader chip U3 is connected with one end of a capacitor C34, other end of the capacitor C34 is connected with one end of a resistor R14, a fifteenth pin is connected with one end of an inductor L3, other end of the inductor L3 is connected with one end of capacitors C39, C48 connected in parallel, and meanwhile the other end of the inductor L3 and other end of the resistor R14 are connected in common with one end of capacitors C31, C41, C44 connected in parallel, other end of the capacitors C31, C41, C44 connected in parallel is connected with one end of capacitors C40, C25 connected in parallel and meanwhile is connected with one end of a resistor R22, other end of the resistor R22 is connected with a first pin of the NFC card reader antenna;

a twelfth pin of the card reader chip U3 is connected with one end of a capacitor C35, other end of the capacitor C35 is connected with one end of a resistor R15, a seventeenth pin is connected with one end of an inductor L2, other end of the inductor L2 is connected with one end of capacitors C38, C47 connected in parallel, and meanwhile the other end of the inductor L2 and other end of the resistor R15 are connected in common with one end of capacitors C26, C42, C43 connected in parallel, other end of the capacitors C26, C42, C43 connected in parallel is connected with one end of capacitors C32, C24 connected in parallel and meanwhile is connected with one end of a resistor R31, other end of the resistor R31 is connected with a third pin of the NFC card reader antenna;

a sixteenth pin of the card reader chip U3 is connected with other end of the capacitors C39, C48 connected in parallel, other end of the capacitors C38, C47 connected in parallel, other end of the capacitors C40, C25 connected in parallel, other end of the capacitors C32, C24 connected in parallel, and one end of a resistor R65, respectively, and is grounded, other end of the resistor R65 is connected with a second pin of the NFC card reader antenna.

10. The electronic cigarette with NFC anti-counterfeiting code according to claim 6, wherein the control circuit board has an output detection circuit comprising an MOS transistor Q1 and an MOS transistor Q2, the MOS transistor Q1 and the MOS transistor Q2 respectively include 8 pins, wherein a first pin, a second pin, a sixth pin, a seventh pin, and an eighth pin are combined and serve as a drain D, a third pin serves as a gate G, a fourth pin and a fifth pin are combined and serve as a source S, the drain D of the MOS transistor Q2 is connected with an output voltage signal PWM-OUT of the heating element, and meanwhile the drain D of the MOS transistor Q2 is connected with a resistor R3 and then connected with a second voltage signal I-DET of the heating element, the second voltage signal I-DET of the heating element is connected with a resistor R33 and a capacitor C2 which are connected in parallel and then is grounded, the drain D of the MOS transistor Q1 is connected with a resistor R11 and then connected with a first voltage signal R-DET of the heating element, the first voltage signal R-DET of the heating element is connected with a resistor R24 and a capacitor C1 which are connected in parallel and then is grounded, a resistor R5 is connected between the drain D of the MOS transistor Q1 and the drain D of the MOS transistor Q2, a resistor R7 is connected in series between the gate G and the source S of the MOS transistor Q2, a resistor R1 is connected in series with the gate G and the source S of the MOS transistor Q1, the source S of the MOS transistor Q2 is directly connected with the source S of the MOS transistor Q1 and is further connected with a power supply signal BAT+, the gate G of the MOS transistor Q2 is connected with an enable signal PWM-EN, the gate G of the MOS transistor Q1 is connected with a resistance detection enable signal R-DET-EN.

11. The electronic cigarette with NFC anti-counterfeiting code according to claim 6, wherein the control circuit board has a power supply circuit comprising a power supply chip U5, the power supply chip U5 includes 4 pins, wherein a pin A1 and a pin B1 are directly connected with each other and meanwhile are connected with a power supply signal BAT+ and capacitors C12, C5, other end of the capacitors C12, C5 is grounded, a pin A2 is connected with a power supply signal VDD and meanwhile is connected with capacitors C13, C3, other end of the capacitors C13, C3 is grounded, a zener diode D4 is connected in series between the pin A2 and the pin A1, and a pin B2 is grounded.

12. An anti-counterfeiting method of an electronic cigarette with NFC anti-counterfeiting code, comprising steps of:
(1) setting an initial relative parameter;
(2) determining whether a switching circuit is turned off or not, if yes, await to go to step (5); if no, go to next step;
(3) by means of a microcontroller, determining whether a standby time exceeds a preset standby time or not, if yes, go to next step; if no, remain in a standby state;
(4) by means of the microcontroller, controlling switching off of the switching circuit, and then going back to the step (2);
(5) connecting a vaporizer with a battery rod or activating an NFC card reader;
(6) by means of the NFC card reader, reading an anti-counterfeiting code preset in an NFC tag and sending the anti-counterfeiting code preset in the NFC tag to the microcontroller;
(7) by means of the microcontroller, comparing an anti-counterfeiting code prestored in the microcontroller with the anti-counterfeiting code preset in the NFC tag and determining whether the anti-counterfeiting code prestored in the microcontroller and the anti-counterfeiting code preset in the NFC tag coincide with each other or not, if yes, go to step (9); if no, go to next step;
(8) by means of the microcontroller, sending out an alarm signal and informing a user to use a valid vaporizer, and awaiting the vaporizer which is invalid to be removed by the user to go back to the step (5);
(9) by means of the microcontroller, controlling switching on of the switching circuit;
(10) entering the standby state of the electronic cigarette, and going back to the step (3).

13. The anti-counterfeiting method of an electronic cigarette with NFC anti-counterfeiting code according to claim 12, wherein between the step (9) and the step (10), the method further comprises steps of:
(9.1) by means of the microcontroller, randomly generating a new anti-counterfeiting code based on a preset program, storing the new anti-counterfeiting code, and sending the new anti-counterfeiting code to the NFC tag;
(9.2) storing the new anti-counterfeiting code by means of the NFC tag.

* * * * *